E. ANDERSON.
METHOD AND APPARATUS FOR ELECTRICAL PRECIPITATION OF SUSPENDED PARTICLES FROM GASES.
APPLICATION FILED JUNE 7, 1921.

1,409,901.

Patented Mar. 21, 1922.

INVENTOR.
Evald Anderson
BY Arthur P. Knight
ATTORNEY.

UNITED STATES PATENT OFFICE.

EVALD ANDERSON, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD AND APPARATUS FOR ELECTRICAL PRECIPITATION OF SUSPENDED PARTICLES FROM GASES.

1,409,901. Specification of Letters Patent. Patented Mar. 21, 1922.

Application filed June 7, 1921. Serial No. 475,772.

*To all whom it may concern:*

Be it known that I, EVALD ANDERSON, a citizen of the United States, residing at Los Angeles, in the county of Los Angeles and State of California, have invented a new and useful Method and Apparatus for Electrical Precipitation of Suspended Particles from Gases, of which the following is a specification.

This invention relates to precipitation of suspended particles from gases by electrical action. Such precipitating operation has generally been effected by passing the gases between electrodes maintained at high potential difference, such electrodes being adapted to produce electrical discharge into the gases and precipitation of the suspended particles in the gases in consequence of the electrical discharge. In order to obtain effective operation in such apparatus it has been found desirable to provide the precipitating apparatus with electrodes of small area from which the discharge takes place, and other electrodes of large area on which the precipitated material is mainly collected; and it has also generally been found necessary to provide unidirectional high potential difference to the electrodes to ensure such an effective operation and also as far as possible precipitation of the material on the collecting electrodes. This has been generally effected by supplying to the electrodes high tension current produced, for example, by rectification of alternating current, the method in general use being to produce a high tension alternating current in the secondary circuit of a step-up transformer and rectify such current by using a mechanical rectifier operating in synchronism with the alternating current supplying such transformer. In installations of large magnitude the cost of the electrical equipment requisite for this purpose is relatively unimportant, whereas in small installations the cost of the electrical equipment, including the transformer, mechanical rectifier, and motor generator or synchronous motor used for supplying the rectified high tension current may be a major item, or at least a very considerable item in the cost of the entire precipitating installation. The main object of the present invention is to obviate the necessity of using rectifying apparatus of this character and to so construct the precipitating apparatus proper that it will, itself, operate as a current rectifying means.

The accompanying drawings illustrate an apparatus suitable for carrying out my invention, and referring thereto:

Figure 1:
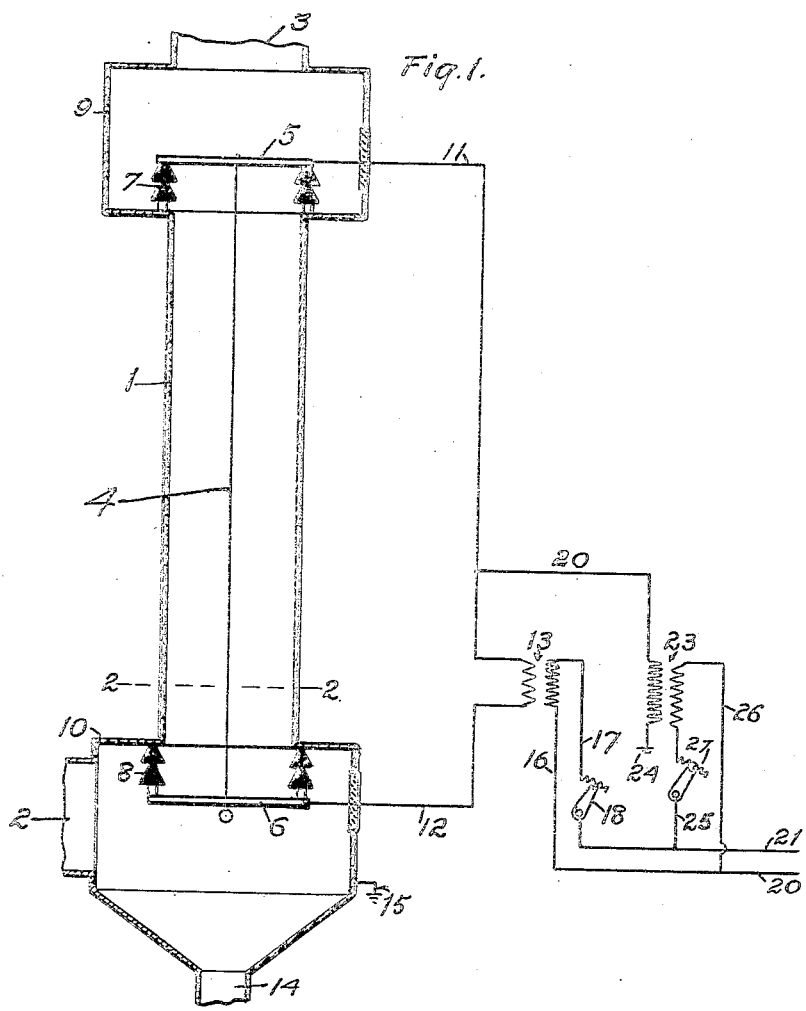
Fig. 1 is a vertical section of an electrical precipitator adapted for carrying out my invention, the electrical energizing circuits being shown diagrammatically.
Figure 2:
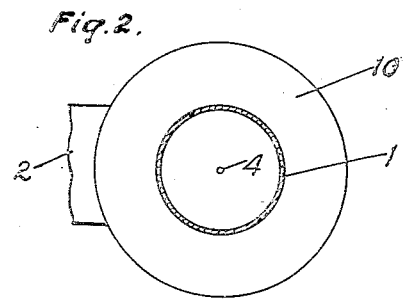
Fig. 2 is a section on line 2—2 in Fig. 1.

In the drawings my invention is shown as applied in connection with a simple, typical form of electrical precipitator of tubular type. It will be understood, however, that the invention is equally applicable to the various forms of electrical precipitating apparatus now in use.

The precipitator shown in the drawings comprises a collecting electrode 1 formed as a vertical tube or pipe communicating at its respective ends with a gas inlet 2 and a gas outlet 3, it being understood that the connections may be such as to pass the gas to be treated upwardly through the pipe or tube, or downwardly therethrough, as may be desired. Within said collecting electrode is provided a discharge electrode 4 consisting of a wire, or other conducting element of small area, supported on insulating means in any suitable manner, for example, connection, respectively, at its upper and lower ends to insulated bars 5 and 6 mounted on insulators 7 and 8 in enlarged portions or headers 9 and 10 connected to the upper and lower ends of the tubular collecting electrode 1.

Means are provided for passing electric current through the discharge electrode 4 to maintain the same in a condition of incandescence or at red heat, so as to provide for emission of electrons therefrom. For this purpose said electrode 4 may be connected at its upper and lower ends, respectively, to wires 11 and 12 leading to opposite ends of a source of current, for example, the secondary coil of a transformer 13, the primary or winding of which is connected by wires 16 and 17 to the wires 20 and 21 of an alternating supply circuit. Suitable means, such as variable resistance or reactance 18, may be connected in the branch circuit to transformer 13 to control or adjust the flow of current to such transformer in order to supply the necessary current to the discharge electrode 4 for maintaining the same incandescent.

Means are also provided for maintaining a high potential difference between the electrodes 4 and 1, for example, the wire 11 connected to the electrode 4 may be connected by a wire 20 to the secondary winding of a transformer 23, the other end of said winding being connected to ground, as at 24. The primary winding of said transformer is connected by wires 25 and 26 to the alternating current circuit wires 20 and 21 aforesaid, a regulating or controlling device, such as a variable reactance or resistance 27, being included in this connection, if desired, to control the voltage supplied to wire 20. The collecting electrode 1 of the electrical precipitating apparatus is grounded, as indicated at 15. The precipitator is provided with suitable means, such as outlets 14 for removing the precipitated material, which is removed from the collecting electrode, when required, by rapping, or otherwise.

The operation is as follows:

The gas to be treated and containing suspended material, such as fume, dust, etc., is conducted into and through the precipitating chamber constituted by the tubular collecting electrode 1, and is therein subjected to the action of an electrical field maintained by the connection to the transformer 26, this electrical field being alternating in correspondence with the alternations of the current supplied from said transformer. The discharge electrode 4 is maintained at red heat or a temperature of incandescence by current passed therethrough produced by the transformer 13 with the result that the said discharge electrode emits or liberates electrons, which are translated by the action of the electrical field during certain half waves of the alternating potential difference toward the collecting electrode; in the other or alternate half waves of the alternating potential difference the electric field produced between the electrodes is such as to prevent the electrons from passing over to the collecting electrode. The discharge electrode therefore acts in the manner of an electric valve or thermionic rectifying device, insuring that the translation of ions from the discharge electrode to the collecting electrode will be largely of one sign and in one direction, with the result that the suspended material is effectively precipitated on the collecting electrode and is not precipitated to any considerable extent on the discharge electrode. The potential difference applied to the electrodes should be sufficiently low to prevent ionization by collision so that the only ions present will be those liberated from the discharge electrode by thermionic action and the temperature of the discharge electrode is so regulated that such ions will all be of one sign, or substantially so, since positive ions predominate at lower and electrons at higher temperatures.

With an apparatus such as above described the potential difference may be much lower than is necessary with the usual electrical precipitators in which a corona or silent discharge is produced by maintaining the potential difference and field intensity sufficiently high to produce ionization by collision. This has the advantage of minimizing insulation difficulties, both in the precipitator and in the transformer or generating apparatus, and correspondingly reducing the cost of such apparatus. The above described construction also has the advantage of eliminating the usual rectifier and the operating means therefor, which in a small installation is a very considerable and sometimes a major part of the apparatus as regards cost of equipment.

What I claim is:

1. The method of electrical precipitation which consists in passing gases containing suspended material between electrodes, applying to said electrodes an alternating potential difference and heating one of said electrodes sufficiently to enable the same to act as a thermionic valve device and thereby rectifying the current passing between the electrodes and effecting precipitation of suspended material on the electrode which is not heated.

2. An electrical precipitating apparatus comprising discharge and collecting electrodes, means for heating said discharge electrode, and means for applying alternating electric potential difference to said discharge and collecting electrodes, so as to cause electric current to pass between said discharge and collecting electrodes, said heated discharge electrode acting as a thermionic valve device to rectify the current passing between the electrodes.

3. An electrical precipitating apparatus comprising discharge and collecting electrodes, means for heating said discharge electrode, and means for applying alternating electric potential difference to said discharge and collecting electrodes, so as to cause electric current to pass between said discharge and collecting electrodes.

In testimony whereof I have hereunto subscribed my name this 27th day of May, 1921.

EVALD ANDERSON.